United States Patent [19]

Jackson

[11] 4,312,550
[45] Jan. 26, 1982

[54] REVOLVING DISPLAY CASE

[75] Inventor: Kenneth E. Jackson, Owensville, Mo.

[73] Assignee: Jahabow Industries, Inc., Owensville, Mo.

[21] Appl. No.: 155,293

[22] Filed: Jun. 2, 1980

[51] Int. Cl.³ .................... A47B 63/06; B65G 19/00
[52] U.S. Cl. ................................. 312/268; 312/97; 312/134; 198/799
[58] Field of Search .............. 312/268, 266, 134, 135, 312/97, 97.1; 198/799

[56] References Cited

U.S. PATENT DOCUMENTS

| | | | |
|---|---|---|---|
| 425,117 | 4/1890 | Van Doren | 198/799 |
| 1,189,137 | 6/1916 | Kingelhofer | 312/134 |
| 2,370,546 | 2/1945 | Kiesling | 312/268 |
| 2,673,780 | 3/1954 | Lyon | 312/268 |
| 2,710,240 | 6/1955 | Berg | 312/268 |
| 2,816,000 | 12/1957 | Scholfield et al. | 198/799 |
| 3,042,472 | 7/1962 | Ibel | 312/268 |
| 3,199,658 | 8/1965 | Graber et al. | 312/268 |
| 3,363,958 | 1/1968 | Antram | 312/268 |
| 3,531,171 | 9/1970 | Raabe et al. | 312/268 |
| 3,589,785 | 6/1971 | Appleby | 312/268 |
| 3,861,519 | 1/1975 | Ware | 312/266 |
| 4,017,132 | 4/1977 | Banys | 312/268 |
| 4,026,617 | 5/1977 | Bosio et al. | 312/268 |

FOREIGN PATENT DOCUMENTS 2823541 12/1979 Fed. Rep. of Germany ...... 312/268

*Primary Examiner*—Victor N. Sakran
*Attorney, Agent, or Firm*—Paul M. Denk

[57] ABSTRACT

A display case for use in exhibiting jewelry and incorporating a pair of sidewalls in its structure, spaced apart a fixed distance, grooves being routed into each sidewall wherein drive linkage or chain are located, and driven by a drive shaft turned by an electric or other motor. Each of the drive chains revolve simultaneously, so that display trays or shelves held at each end by each of the sidewall disposed linkages are revolved about the display case for exhibiting merchandise.

12 Claims, 6 Drawing Figures

U.S. Patent  Jan. 26, 1982  4,312,550
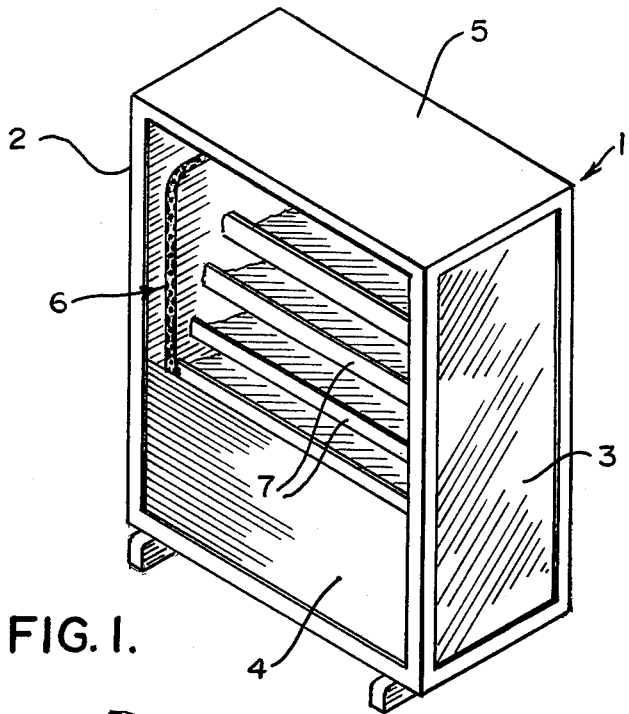
FIG. 1.
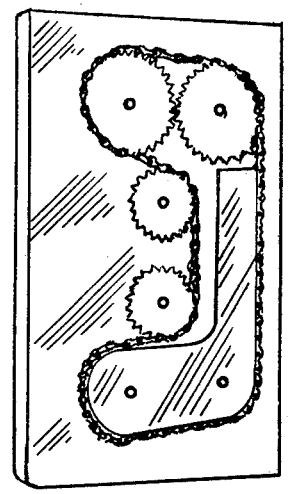
PRIOR ART
FIG. 2.
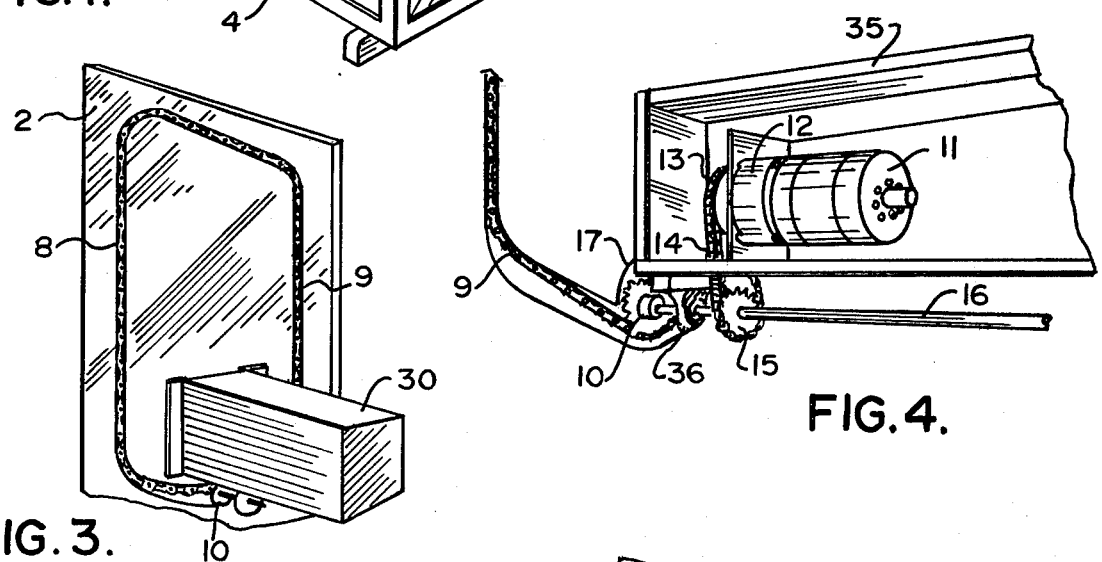
FIG. 3.
FIG. 4.
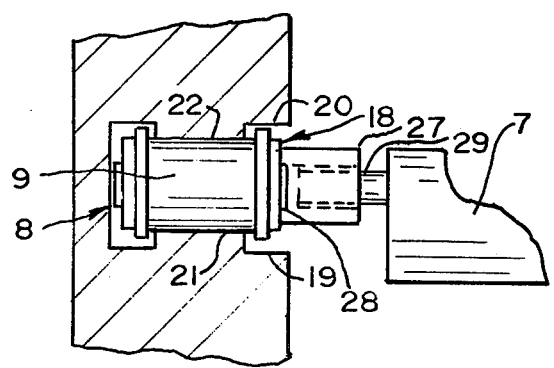
FIG. 5.
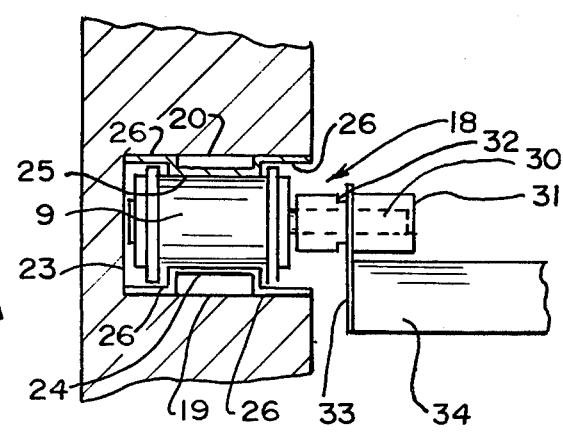
FIG. 6.

REVOLVING DISPLAY CASE

BACKGROUND OF THE INVENTION

This invention relates generally to a display case, and more particularly pertains to a display case wherein its plurality of shelves are revolvable and ride upon tracks that are formed in conjunction with the structure of the sidewalls for the fabricated display.

Various styles of display cases are readily available in the prior art, as is well known, and are used for showing a variety of merchandise. And, as in the jewelry and accessory fields, it is desirable in many instances to have the merchandise being displayed to be brought ito its best view, and that is positioned at the upper frontal portion of the display case, so that the observer can readily see and appreciate the high value of the merchandise being displayed from its best vantage point. As a result, many display cases have been constructed that utilize shelves or trays that can be revolved about a predetermined path within the case, so that shelves may be brought, through motor power, up to a position where their merchandise can be most conveniently observed.

Examples of the type of prior art merchandise display cases that utilize revolving trays is shown in the Berg, U.S. Pat. No. 2,710,240, wherein, as can be seen, the construction of this shown cabinet incorporates a variety or group of sprockets that are located upon the sidewalls of the cabinet, and function as means for converging of a conveyor chain that provides for circulation of its suspended trays. It can be readily observed that, in this particular prior art cabinet, a multitude of at least six sprockets must be operatively associated with each side wall of the cabinet in order to provide for simultaneous and uniform motion of the plurality of suspended trays about the perimeter of the shown cabinet, in order to maneuver said trays into convenient positions for viewing.

The Lyon U.S. Pat. No. 2,673,780, discloses a selective display cabinet, wherein a chain is located for revolving about, once again, various sprockets that are located upon the surface of the sidewall of the cabinet. This Lyon patent, not too unlike the previously reviewed Berg patent, shows what commonly has been the mode of attaining movement for display case shelves, in a revolving type of display case, and that being the combination of a multitude of sprockets and a sprocket chain that suspends the trays for movement.

The Ibel U.S. Pat. No. 3,042,472, discloses a vertically movable filing cabinet, wherein sprocket held chains are arranged for being moved along either side of supports for the cabinet structure, and once again, such is very similar to what has previously been described in the prior art, wherein a plurality of sprocket, and sprocket chains, are used, as in this instance, with structured supports for holding a plurality of movable trays.

The Bosio, U.S. Pat. No. 4,026,617, discloses an apparatus for storing and displaying articles, and while the shown sprockets may be located within the confines of upright supports for the casing, there is no actual use of the casing wall itself as an integrally designed type of rail for supporting the drive chains themselves. The Graber, U.S. Pat. No. 3,199,658, discloses a power filing appliance having its drive means associated with the sidewalls of the structure and forming through the arrangement of stabilizing tracks, means for holding arms during movement of drive chains within the same. These tracks and guides are not formed by routing, or by any other method, within the sidewalls of the shown appliance, but rather, it would appear that the tracks are formed through the locating of supplemental metallic tracks onto sidewall support plates of the device.

The Antram, U.S. Pat. No. 3,363,958, discloses a similar type of power file level control means as that previously analyzed with respect to the shown Graber patented device. Finally, in the Raabe, et al, U.S. Pat. No. 3,531,171, there is shown a vertical mechanical filing cabinet, with its filing means being supported through the use of a drive chain that revolves about a sprocket that is apparently appended to the sidewalls of the cabinet, but which does not form a track that is integrally structured within the sidewalls of the cabinet structure per se. A similar type of construction is shown in the display cabinet of Ware, U.S. Pat. No. 3,861,519, wherein the entire cabinet would appear to be fabricated from metallic means, and would not provide integrally any form of track means that is routed within the sidewalls of the same.

In referring to the drawings of this current application, and as most specifically shown in the FIG. 2, one of the most current type of revolving form of display cases currently being marketed is shown, and it includes what is very similar in construction to that previously analyzed in the Berg U.S. Pat. No. 2,710,240, and that being the use of a series of sprockets, approximately six in number, and which have the chained drive operatively associated with the multitude of sprockets appended to each sidewall of the shown cabinet. Thus, as can be seen from this and the other type prior art devices analyzed herein, the thrust of the prior art is to extensively apply and utilize sprockets as a means for attaining support for some type of a drive chain, with all of such hardware being supported upon the surface of particularly the sidewall structure for the shown cabinets, and not being integrally embedded or formed therein as is attained in the current invention.

It is, therefore, the principal object of this invention to provide a revolving display cabinet wherein its various trays are simultaneously moved through the use of chain and track structure that is operatively located within the sidewall structure for the designed cabinet.

Another object of this invention is to provide a revolving display case, i.e., where the trays revolve about a fixed path, and wherein the tracks for said revolving trays are integrated into the structure of the sidewall for the display case.

Still another object of this invention is to provide a revolving display case that is substantially reduced in cost to manufacture, due to the fabrication of rails for tracks that support the revolving trays and which are milled internally within the sidewalls for the display case.

Still another object of this invention is to provide a display case containing revolving shelves or trays and in which the mechanism for revolving the trays is substantially concealed within the sidewalls of the apparatus.

Yet another object of this invention is to provide a display case containing revolving trays which are motivated through substantially reduced or diminished use of sprockets as required in the prior art.

Another object of this invention is to provide drive means for revolving shelves of a display case and which is capable of providing precise simultaneous movement to the tray linkages as contained at opposite sides of a display case.

Still another object of this invention is to provide a display case which can be constructed in substantially reduced time due to the integration of its operating structure within its framework than what has been and can be accomplished from the prior art.

These and other objects will become more apparent to those skilled in the art upon reviewing the summary of this invention, and upon undertaking a study of the preferred embodiment in view of the drawings.

SUMMARY OF THE INVENTION

This invention contemplates the formation of a display case containing revolving shelves or trays, and which may have the outward appearance of the usual style of case operating in said manner, but with its inherent structure due to its unique fabrication being quite different in operation and function than any type of cases shown in the prior art. For example, this case includes, amongst other structure, a pair of sidewalls, having track means formed integrally within the structure of the sidewall, with the tracks being formed, as by means of routing, grooving, milling, or the like, at some depth within each sidewall and opening interiorly of the display case. Located within each sidewall groove, as formed into a track formation, are the drive linkages or chains that have the trays suspended from them, so that each chain is capable of providing independent motion to the proximate side of each suspended tray, thereby furnishing complete and uniform motion to the trays in their revolving about a fixed course or path within the display case. But, drive means are furnished through the use of a single motor, and which drive means is linked by means of a belt to a drive rod, with the drive rod extending laterally and into proximity with each sidewall of the display case, wherein a gear locates within aligned cavities formed within each sidewall, and wherein each gear interengages or meshes with the drive chains associated with each wall, as aforesaid.

The tracks or grooves provided within each sidewall furnish the path for movement of the drive linkages about the sidewalls, upon energization of the associated electric motor, and generally the invention is designed to provide for a display of merchandise upon each tray or shelf in the vicinity of the upper front or the forward top portion of the display case, which may be opened for access to the customer, or be glass enclosed, for safety reasons, but yet be readily disposed for facile viewing by the prospective customer, as when the merchandise laden trays are moved into their viewable positions generally at the upper front of the displayed case. The interior of each track as formed within the sidewalls for the case may be routed to form a rail upon either one or both of the inner and outer surfaces of each channel-like groove, and which rail cooperates with the links of the drive chain to embrace them into position within the formed channels, and to keep them within the confines of the formed track to assure their retention therein, and their simultaneous movement without malfunctioning during revolving of the various display case trays. In addition, such formed rails may also be created through the use of metal or plastic bands, or the like, that can be fastened, glued, or otherwise adhered within the formed channel grooves, so as to furnish similar type rails that effectively support the drive linkages, or the entire drive chain, during display case usage.

BRIEF DESCRIPTION OF THE DRAWINGS

In the drawings,

FIG. 1, provides an isometric view of the display case containing revolving shelves of this invention;

FIG. 2, as previously analyzed, provides an internal side view of the drive chain and multiple sprockets as used in similar type revolving display cases in the prior art;

FIG. 3 shows an internal view of one sidewall containing a drive linkage of this invention, and partially shows the cover for the drive means of this invention;

FIG. 4 furnishes a partial view of the drive linkage or chain as contained within a sidewall groove, and additionally shows the motor and drive means used for producing movement to the said drive linkage;

FIG. 5 shows a sectional view of a sidewall formed track, having the drive linkage or chain contained therein, and suspending one end of an associated display case tray; and FIG. 6 shows a modification in the construction of a sidewall track, wherein rails formed of metal, plastic, or the like are located for holding the drive linkage or chain in place.

DESCRIPTION OF THE PREFERRED EMBODIMENT

In referring to the drawings, and in particular FIG. 1, there is disclosed the display case 1 of this invention and which is structured, in usual fashion, having sidewalls 2 and 3, a lower front wall 4 and a top 5. The case, as in the usual design of these type of cases, normally incorporates a view panel 6, which may or may not be glass enclosed, so that the series of trays 7 may be appropriately viewed by any customer or prospective purchaser of any merchandise, such as jewelry, or other accessories, that may be displayed upon the said trays or shelves 7. And, it is equally likely that the top panel 5 may also be wholly or partially fabricated from glass, or other transparent material, as is customarily done in the trade, so that the same merchandise, as laden upon the said shelves, may be readily observable by a viewer.

In referring also to the FIGS. 3 and 4, the uniqueness of this invention is embodied in the formed tracks 8, provided within the interior surfaces of each of the sidewalls 2 and 3, and which tracks 8 function as rails upon which the drive linkage, such as the chain 9, as shown, may freely ride in revolving about the predetermined course delineated by the positioning of the formed tracks 8. In the preferred embodiment, these tracks 8 are formed by integrally routing the same within the interior wall of each of the sidewalls 2 and 3 of the display case, but, it is just as likely that similar type tracks may be molded from plastic, or the like, and possibly arranged upon the interior surfaces of said sidewalls, and act quite effectively as tracks for guiding the movement of the linkages 9 about the track laid out course.

The linkages 9 are the type that can be driven by gear teeth, such as the drive gear 10, as shown, and is not too unlike the usual style of bicycle chain that is driven similarly during that type of usage.

In this invention, drive means 11, comprising a motor, may act in cooperation with a speed reducer, as at 12, providing rotational power to its outlet shaft and gear 13, which in turn rotates a belt 14 that locates upon a sprocket 15 that is fixedly mounted to a drive rod 16. The ends of the drive rod extend into proximity with the sidewalls 2 and 3, and at each end of the drive rod is located the drive gear 10 that has its teeth intermeshed within the drive linkage 9, as aforesaid. It can be seen that in order to align the drive gears 10, one which is provided at each end of the drive rod 16, with the linkages 9, there are also provided within each sidewall 2 and 3, of the display case, a cavity 17 being formed within the interior of each of the said sidewalls, with the teeth of the gear 10 being aligned within the links of the drive linkage 9.

The specific construction of the preferred embodiment for the track 8 is shown in FIG. 5, and such is provided within each of the sidewalls 2 and 3. The track is formed through a routing, milling, or grooving of a channel 18 within each sidewall, and to the depth as shown. Inner and outer surfaces 19 and 20, respectively, are formed within each channel, and provided upon each of these surfaces is a raised portion forming an integral rail 21 and 22 that is associated with each of the surfaces 19 and 20, respectively, and which function as the means for supporting the drive linkage 9 for rather confined movement within the formed track 8. It can be seen that the track 8 is continuous around the interior of each sidewall, communicates with the gear cavities 17, as previously explained, and through the locating of the linkage or chain 9 therein, a fixed track is provided that readily adheres the linkage therein and provides a convenient rail-like surface upon which the linkages ride during their turning through the operations of the motor 11. Thus, as can be seen, idler type sprockets are totally eliminated from usage in providing guided movement to the linkages 9 and suspended trays 7 of this type of invention.

It may be desirable, in a modification, and under certain conditions, that the rails 21 and 22 be formed of material other than being routed from the wood or other materials forming the sidewalls 2 and 3 of the display case. Where this is the case, and as can be seen in FIG. 6, the channel 18 will be formed therein, having its lower and upper surfaces 19 and 20 yet being formed therein, and a back surface 23, all being milled or routed as a singular channel arranged around the periphery of the display case, forming the track 8, as previously analyzed with respect to FIG. 1. But, rails 24 and 25 may be formed independently from other materials, such as metal or plastic, and be adhered upon the respective surfaces 19 and 20, as shown, for providing a more wear resistant type of rail for use in forming the track of this invention. If desired, and to add to the convenience of the positioning of these rails in place, they may contain lateral flanges, as at 26, for adding to the convenience of their installation, and fastening with the surfaces 19 and 20, but in addition providing further wear surface that can resist deterioration during the many years of continued usage of a display case of this type.

The means for suspension of the trays 7 upon the linkages 9 are also shown in FIG. 5, and may include a sleeve-like member 27 and which functions as a ferrule or other member for mounting onto the links of the chain 9, and in this instance, to the link shaft 28, as shown. Then, a spindle or pintle 29 rigidly securing with the proximate end of the tray 7 locates within the aperture provided through the sleeve 27, thereby supporting the tray pivotally in place, so that as the tray revolves about the interior of the display case, it by gravity will always remain upright, readily displaying its merchandise to the viewing customer. Obviously, other means for pivotally mounting the trays 27 to the drive linkage 9 may be readily determined and provided. For example, as can also be seen in FIG. 6, the rod 30 of a link 9 may extend laterally outwardly of the same, and have a sleeve 31 pivotally mounted thereon, and which sleeve includes a slight circumferential groove 32 therearound, and in which a flange 33 of a tray 34 may locate for pivotally suspending the tray therefrom.

As can also be seen in FIG. 4, and to enhance the esthetics of this display case, the drive means 11 may be covered by means of the enclosure 35, and which also partially conceals the drive rod 16, its sprocket 15, in addition to partially concealing the drive gears 10. Furthermore, extending from the underside of the closure 35 are a pair of bearing mounts, one as shown in 36, and which effectively journals the drive rod 16 proximate both ends of the enclosure 35 for stabilizing it in position, and for effectively driving the gears 10, which in turn move the drive linkages 9 about the formed sidewall tracks 8.

Once again, journals of this nature may be even located upon the base of the display case, since it is readily a matter of expediency, and design concept, as to where such mechanisms may be located.

Variations or modifications in the design and structure of this revolving display case may occur to those skilled in the art upon reviewing the contents of this invention. Such modifications, or variations, if within the spirit of this invention, are intended to be encompassed within the scope of any claim protection issuing upon this invention. The description of the preferred embodiment, as set forth herein, is provided for illustrative purposes only.

Having thus described the invention what is claimed and desired to be secured by Letters Patent is:

1. A display case for use in exhibiting jewelry or various other merchandise, and being of the type incorporating a series of revolving trays for furnishing sequentially and eventually direct viewing of all of the shelved merchandise, the structure of said case including a pair of sidewalls being spaced apart a fixed distance, a pair of drive linkages, one drive linkage being operatively associated with the sidewalls, said trays at each end being suspended upon the pair of drive linkages, drive means provided within the case, and said drive means operatively connecting with each drive linkage and when energized inducing the simultaneous movement of the linkages and their suspended trays along a predetermined course about the display case, each sidewall having disposed tracks arranged therewith and upon which the drive linkages move, said sidewall tracks being integrally routed to form a groove within the structure of each sidewall, whereon upon operation of the drive means the drive linkages ride within their respective sidewall tracks for movement of the trays sequentially into viewing positions.

2. The invention of claim 1 and including there being a patterned groove provided within each disposed sidewall of the display case and forming the tracks for the drive linkages, said grooves being of sufficient depth to provide for locating of said linkages therein.

3. The invention of claim 2 and wherein each groove is formed to channel-like shape and having continuous inner and outer surfaces formed therein and an integral back surface arranged therebetween.

4. The invention of claim 3 and wherein at least one of the inner and outer surfaces includes a continuous raised portion formed therearound and functioning as a formed rail upon which the associated drive linkage rides during linkage and tray movements.

5. The invention of claim 4 and including continuous raised portions being formed upon both the inner and outer surfaces of each provided sidewall groove and functioning as parallel disposed rails for guiding the movement of the associated drive linkage and incident revolving of the display case trays.

6. The invention of claims 4 or 5 and wherein each raised portion is integral with at least one of the inner and outer surfaces of the sidewall groove.

7. The invention of claims 4 or 5 and wherein each raised portion being formed by a band secured around at least one of said inner and outer surfaces of a sidewall groove.

8. The invention of claim 7 and wherein said band includes flanges extending laterally therefrom.

9. The invention of claim 1 and wherein said drive means includes a motor, a drive rod associated with and being drive by said motor during its operation, a gear provided at each end of the drive rod and driven in simultaneous rotation therewith, one of each gear intermeshing with one of the drive linkages to induce their simultaneous movement upon motor energization.

10. The invention of claim 9 and including a cover concealing said motor and partially the driven rod.

11. The invention of claim 10 and wherein said rod being supportively journaled to said cover.

12. The invention of claim 1 and including support means connecting with the drive linkage, said support means useful for suspending one end of a tray for movement coincident with the driving of the linkage about its formed track.

* * * * *